United States Patent [19]

Mani

[11] Patent Number: 4,800,807
[45] Date of Patent: Jan. 31, 1989

[54] APPARATUS FOR THE MANUFACTURE OF PERFORATED PITA BREAD

[75] Inventor: Daniel Mani, 838 N. Doheny Dr., #501, Los Angeles, Calif. 90069

[73] Assignees: Daniel Mani; Simon Mani, both of Vernon, Calif.

[21] Appl. No.: 51,503

[22] Filed: May 18, 1987

[51] Int. Cl.$^4$ ................................................ A23P 1/00
[52] U.S. Cl. ........................................ 99/450.2; 83/862; 83/875; 83/879; 99/450.1; 99/485; 99/537
[58] Field of Search ............... 99/349, 353, 372, 373, 99/355, 484, 485, 509, 510, 537, 538, 567, 450.1, 450.2; 426/496, 128; 83/866, 867, 870, 872, 875, 876, 884, 886, 862, 879

[56] References Cited

U.S. PATENT DOCUMENTS

| | | | |
|---|---|---|---|
| 785,914 | 3/1905 | Peters | 99/450.1 X |
| 2,223,828 | 12/1940 | Larson | 83/862 |
| 3,277,846 | 10/1966 | Kesselman | 99/537 |
| 3,869,975 | 3/1975 | Seewer | 99/450.2 |
| 4,075,359 | 2/1978 | Thulin | 83/862 X |
| 4,281,025 | 7/1981 | Longenecker | 426/496 |
| 4,526,093 | 7/1985 | Fogerson | 99/537 X |
| 4,597,979 | 7/1986 | Goglanian | 426/496 |

Primary Examiner—Timothy F. Simone
Attorney, Agent, or Firm—Blakely, Sokoloff Taylor, Zafman

[57] ABSTRACT

An apparatus for the manufacture of perforated pita bread is disclosed. The apparatus includes a cylindrical roller having disposed on the surface thereof substantially circular blades with a sawtooth blade disposed along the diameter of each circular blade. The blades cut from a flattened sheet of pita dough traveling along the conveyor belt a plurality of perforated pita loaves having perforations therein for convenient tearing, which perforated pita loaves do not rupture during the baking process.

10 Claims, 2 Drawing Sheets

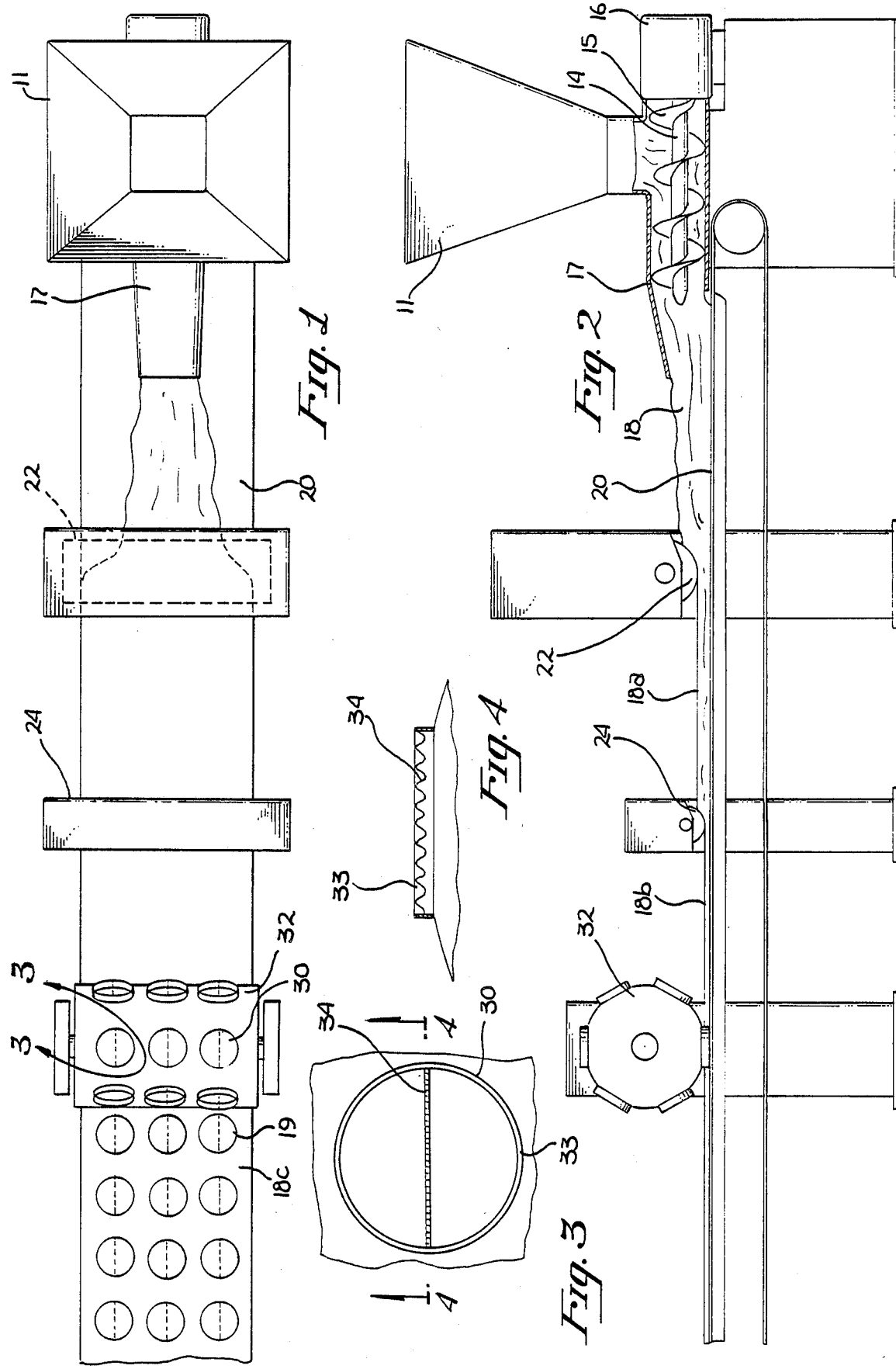

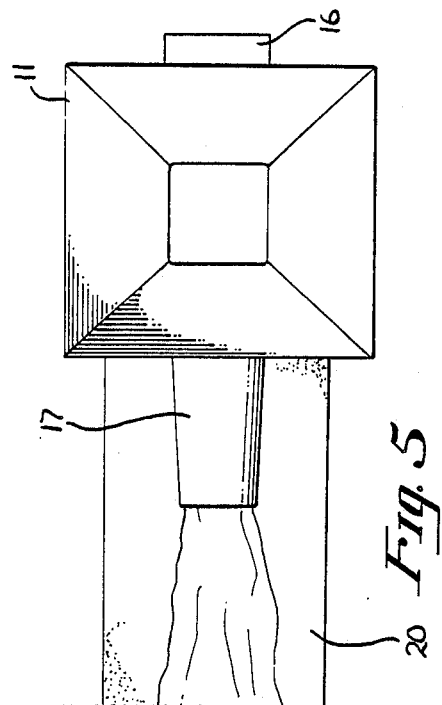
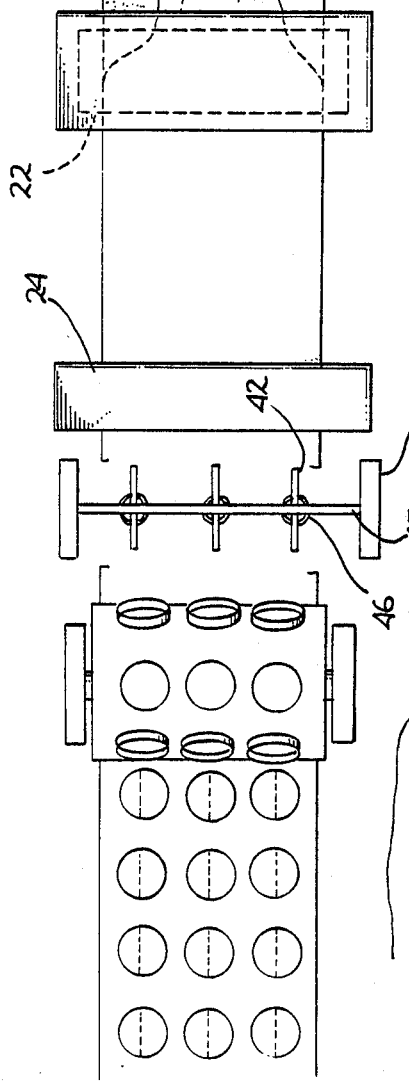
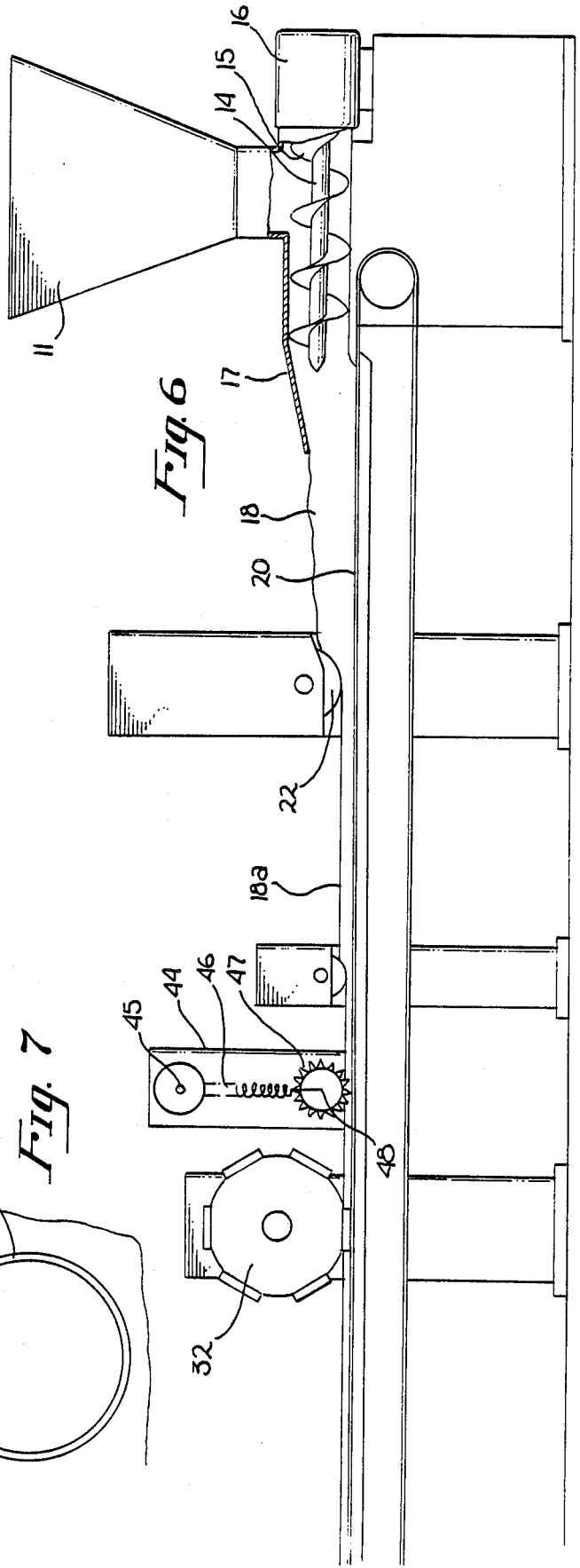

APPARATUS FOR THE MANUFACTURE OF PERFORATED PITA BREAD

FIELD OF THE INVENTION

This invention relates to an apparatus for the manufacture of perforated pita bread having perforations therethrough along the flat surface thereof for convenient separation of the portions of the pita bread to expose the interior thereof and provide smooth unfaulted exteriors thereon, and a method of making such pita bread using a device of the type described herein.

BACKGROUND AND PRIOR ART

Pita bread, also known as pocket bread, is a bread of Middle Eastern origin dating back a number of centuries. In general, pita bread comprises a relatively flat bread having a generally rounded or oval shape. An important aspect of the pita bread is that as a result of a specific baking process described in more detail below, a pocket or inner chamber is formed which can serve to hold various food ingredients such as meats, grains, vegetables, sauces and the like. Thus, pita bread is usually stuffed with these components and eaten.

In the manufacture of pita bread in the prior art, the components of the bread, basically comprising flour, water, yeast, sugar, and salt, as is known in the prior art, are mixed together in a large hopper. The dough formed thereby is then allowed to rise and in a commercial system is formed usually on a conveyor system into the shape of the flattened bread product having a rounded or oval shape. The pita bread in its rounded shape is then allowed to rise slightly, and is then baked in an oven. In the oven, the bread rises as the pocket formed between the top and bottom surface thereof expands as a result of the elevated temperature in the oven.

A problem arises in most prior art pita bread in that it is necessary to cut each pita loaf to gain access to the pocket therein. Conventionally, the pita loaf is cut with a knife. Fast food chains, institutional food suppliers and others have a need for a quick, safe and efficient method of gaining access to the pocket than the standard prior art procedure of using a knife to cut along the surface of each loaf. Individually cutting each loaf is time consuming and somewhat dangerous in that the need to use a knife or other sharp instrument to cut the loaf creates a greater risk of an accidental injury to those working with the loaves and those around them. This is particularly important in view of the fact that many workers in the fast food industry have minimal training and often work under time pressure constraints. There is also a need for standardization in the large food service industry to create a more efficient working system.

A major drawback found in the commercial manufacture of pita bread is that during the baking process as the air inside the pita bread expands forming the pocket, the gases contained therein expand to an uncontrolled amount thereby causing tears, breaks and crevices in the surface of the pita bread. This tends to cause substantial problems because such tears or crevices create permanent faults in the breads surface which can result in leaks of the food and sauces contained in the pocket after it is stuffed. Obviously, such leaks can be messy if the sauces, unbeknownst to the eater, leak out on the eater's clothing, hands and the like.

This problem of obtaining undesired faults in the surface of the pita bread was addressed in a United States Patent obtained by Goglanian (U.S. Pat. No. 4,597,979). Goglanian describes creating small holes in the surface of unbaked pita bread, preferably along the diameter thereof, so that when the perforated pita bread is baked, additional rupturing occurs on the surface thereof, which rupturing allows the escape of the gases inside the pita pocket. Goglanian also describes a number of devices for the manufacture of the invented pita, generally comprising multiple steps and manual perforation of each loaf.

There are a number of drawbacks to the Goglanian system in that the rupturing may be somewhat controlled, and in any event, rupturing is unnecessary for the production of perforated pita bread. The rupturing of the piror art pita bread is also disadvantageous because until such rupturing occurs, the gases may create a weakness in the walls in the pita bread and other areas until such time as the gases can rupture the pita bread in the desired location.

The present device and process overcome the limitations and inadequacies of the prior art to produce a pita bread having the desirable characteristics of perforations without rupturing thereby providing easy separation of the halves thereof and access to the pocket contained therein.

SUMMARY OF THE INVENTION

The pita bread of the present invention facilitates the user in attempting to divide the pita bread into two evenly divided portions without the assistance of a knife or other sharp cutting utensil.

The present invention comprises a device for the manufacture of perforated pita bread and a process for obtaining the same using the invented device. The present device includes a conventional type pita bread dough processor including a hopper for mixing the dough, a device for distributing the dough onto a conveyor system, a first roller for flattening the dough a first determined amount, a second roller for flattening the dough a second amount to approximately its final thickness, so that the dough after the second roller is a flat sheet approximating the width of the conveyor system. The dough is then passed under a drum having disposed thereon pita cutters for cutting pita bread into the desired shape and for providing said pita bread with perforations therein, each such perforation being of such substantial depth and width so as to provide convenient exit of the gases produced therein during the baking to the outside to relieve the pressure therein without rupturing.

The invented drum is disposed on a spindle about which it rotates and the spindle is disposed a predetermined distance above the conveyor belt such that the perameter of the drum is close to the conveyor belt on which the pita dough travels. Disposed about the perimeter of the drum are a plurality of perforated pita cutters. Each pita cutter comprises a rounded, oval or substantially circular blade or cutting surface capable of cutting the dough into a round pita shape, and further comprises a perforating blade disposed along the diameter or a chord of each of said circular blades, each perforating blade having a sawtooth shape. The sawtooth shape is of the appropriate dimensions such that the perforations formed in the dough are of sufficient depth and width that when gases are formed in the dough during the baking thereof they inflate the dough to form the pocket therein but otherwise, are incapable of causing the surface of the pita, particularly along the perforated line created by the pita cutter, to rupture. As such, evenly shaped perforated pita loaves are cut from the dough disposed on the conveyor. The pita cutters are disposed on the drum in a geometry to obtain a large number of perforated pita loaves per volume of dough. The remainder dough may be removed by hand or by machine, and returned to the hopper or elsewhere on the conveyor line.

In an alternate embodiment, the thin sheet of dough disposed on the conveyor system is first perforated with an appropriately positioned perforating blade such as a flat blade or a rotating wheel, and is then cut into its final rounded shape utilizing a pita cutter disposed on a rotating drum, as described above, but which is lacking the perforating blade disposed within the circular blade.

BRIEF DESCRIPTION OF THE DRAWINGS

FIG. 1 is a plan view of a conveyor for making perforated pita bread including the perforated pita cutting device of the present invention.

FIG. 2 is a side view of the device shown in FIG. 1.

FIG. 3 is an enlarged inferior plan view of an individual pita cutter taken through lines 3—3 of FIG. 1.

FIG. 4 is a sectional view of the perforated pita cutter taken through lines 4—4 of FIG. 3.

FIG. 5 is a plan view of an alternative embodiment of the inverted system.

FIG. 6 is a side view of the alternative embodiment of the system shown in FIG. 5.

FIG. 7 is an enlarged inferior plan view of an individual pita cutter with the perforating blade disposed along a chord of the pita cutter.

DETAILED DESCRIPTION

As shown in FIG. 1 each pita loaf is formed to be substantially circular with perforations therein, preferably along a chord or the diameter thereof. In this manner a perforated pita bread is formed which can be easily separated into two sections by simply tearing them apart. If the perforations are provided along the diameter, each section has its pocket exposed so that it can be filled or stuffed with various foods according to its customary use. If the perforations are provided along a chord near the perimeter of the pita loaf, a single loaf having a large pocket is created. A second function of the perforations is to allow hot air and gases which are formed during baking to escape so that while the perforated pita bread rises and the pocket is filled with gases during its formation there is no rupturing of any of the surface of the perforated pita bread, even along the perforated line, because the gases can escape through the existing holes formed in the loaf by the invented apparatus before any such rupturing can occur.

As shown in FIG. 1, a standard conveyor system which is used for the manufacture of pita bread is disclosed in which there is first shown a hopper 11 in which the pita dough made in a separate assembly is placed. The dough may be filled therein to a desired level so that a proper flow of pita dough is fed to the remainder of the system. The dough travels through the hopper 11 to an auger 14 having spiral threads 16 thereon. The auger 14 is driven by a motor drive 15 which drives the dough 18 through chute 17 onto conveyor 20. The pita then goes under roller 22 which flattens the dough 18a into a flat sheet of predetermined thickness. Roller 24 disposed further along conveyor 20 flattens the dough 18b to approximately the desired thickness prior to baking. The resultng dough 18b from roller 24 is then passed under roller 32 which cuts the pita loaves 19 out of the dough 18b.

As shown in FIG. 4, the pita cutter 30 comprises a circular, oval or substantially circular blade 33 with a sawtooth shaped blade 34 disposed therein along the diameter thereof. The teeth of each pita cutter 34 as shown in FIG. 4 are preferably 1/16 to ⅛ inches deep and there are approximately 6 teeth per inch across a diameter of 4 to 5 inches. The teeth are preferably rounded or flat, rather than pointed at the top thereof. Of course the frequency, size and shape of the teeth can vary greatly, with the understanding that they are intended to be of sufficient depth and geometry so as to prevent rupturing of the pita loaf along the perforated line during baking. Of course, it will be appreciated that it is not necessary for the perforations to be provided along the diameter and that they can in fact, be provided along a chord of the substantially circular or oval pita bread if a larger size pita pocket is desired. As shown in FIG. 7, the perforating blade 42 of the pita cutter 40 is disposed along a chord displaced from the diameter of the pita cutter.

As shown in FIG. 1, pita cutters 30 are disposed in alignment across rows along roller 32 and each row contains three pita cutters. It will be obvious from one skilled in the art that the precise placement and spacing of the pita cutters can vary without departing the spirit or scope of the present invention.

After the perforated pita loaves are cut from the dough, the remainder of the dough 18c can be removed and recycled into the 12 or otherwise disposed of. The cut loaves 19 are then run through a pita oven as is standard in the art and the pita loaves are allowed to rise and form pockets therein accordingly.

It would be obvious to a person of ordinary skill in the art that a number of changes and modifications can be made to the existing apparatus and process without departing from the spirit and scope of the present invention. It is contemplated that the present invention is encompased by the claims as presented herein and by all variations thereof coming within the scope of equivalents accorded thereto. FIGS. 5 and 6 illustrate an alternate embodiment of the present invention in which the pita dough is separately perforated on the conveyor belt and cut into pita loafs. As shown in FIG. 5, the apparatus is substantially the same as the apparatus shown in FIG. 1, except that the pita cutters 30 lack the perforating blade 34, and a perforating means 44 is provided. In FIG. 5 the perforating means is provided prior to the pita cutter, although it will be appreciated by a person of ordinary skill in the art that the perforating means can be disposed along the conveyor system subsequent to the pita cutter.

As shown in FIG. 6 the perforating means 44 comprises a horizontal support bar 45, vertical support bars 46 and saw toothed wheels 47 disposed on spindles 48 so that they can freely rotate from the force applied by the dough thereon.

I claim:

1. In a pocket bread manufacturing apparatus of the type having a conveyer system and providing a flat sheet of dough on said conveyor having a predetermined thickness, the improvement comprising a pita cutter comprising a cylindrical wheel having a circumferential surface, said cylindrical wheel being rotatably mounted above said conveyor with the circumferential surface thereof disposed near said conveyor, said wheel having disposed on the circumferential surface thereof a plurality of circular blades which come in contact with said conveyor when disposed adjacent thereto, each circular blade having disposed therein along a chord of said circular blade a perforating means comprising a row of a plurality of teeth of sufficient depth to provide in a pita loaf formed thereby perforations along said predetermined position, whereby a pita loaf is formed which during baking does not rupture as a result of the gases escaping from said perforations during baking.

2. The apparatus of claim 1 wherein said plurality of circular blades comprises a plurality of rows of circular blades, each row having three pita cutters across.

3. The apparatus of claim 1 wherein said plurality of teeth each have a depth in the range of 1/16 to ⅛ of an inch.

4. The apparatus of claim 3 wherein said plurality of teeth comprise approximately 6 teeth per inch.

5. An apparatus for the manufacture of perforated pita bread comprising:
 a hopper for holding and distributing pita dough;
 means for removing said dough from said hopper;
 a conveyor belt having one end disposed near said means for removing said dough;
 a first roller disposed on said conveyor belt for flattening and spreading said dough on said conveyor belt;
 a perforated pita cutting means comprising a cylindrical wheel disposed over said conveyor, said cylindrical wheel having an exterior surface adjacent to said conveyor;
 said exterior surface having disposed thereon a plurality of circular blades which come in contact with said conveyor when said blades are in the downward position;
 each circular blade having disposed therein along a chord of said circular blade a perforating means comprising a plurality of teeth of sufficient depth to provide in a pita loaf formed thereby perforations along said chord, whereby a pita loaf is formed during baking which does not rupture as a result of the gases escaping from said perforations during said baking.

6. The apparatus of claim 5 wherein said plurality of circular blades comprises a plurality of rows of circular blades, each row having three pita cutters across.

7. The apparatus of claim 5 wherein said plurality of teeth each have a depth in the range of 1/16 to ⅛ of an inch.

8. The apparatus of claim 7 wherein said plurality of teeth comprise approximately 6 teeth per inch.

9. The apparatus of claim 1 wherein said row of a plurality of teeth is disposed along the diameter of the circular blade.

10. The apparatus of claim 5 wherein said row of a plurality of teeth is disposed along the diameter of the circular blade.

* * * * *